(12) United States Patent
Fukumoto (10) Patent No.: US 11,007,566 B2
(45) Date of Patent: May 18, 2021

(54) CASTING GREEN SAND MOLD, AND METHOD FOR PRODUCING CAST ARTICLE USING IT

(71) Applicant: HITACHI METALS, LTD., Tokyo (JP)

(72) Inventor: Kentaro Fukumoto, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 219 days.

(21) Appl. No.: 15/504,411

(22) PCT Filed: Aug. 19, 2015

(86) PCT No.: PCT/JP2015/073215
§ 371 (c)(1),
(2) Date: Feb. 16, 2017

(87) PCT Pub. No.: WO2016/031642
PCT Pub. Date: Mar. 3, 2016

(65) Prior Publication Data
US 2017/0232504 A1    Aug. 17, 2017

(30) Foreign Application Priority Data
Aug. 29, 2014    (JP) .............................. JP2014-176456

(51) Int. Cl.
*B22C 3/00* (2006.01)
*B22C 9/02* (2006.01)
(Continued)

(52) U.S. Cl.
CPC .............. *B22C 9/02* (2013.01); *B22C 1/167* (2013.01); *B22C 1/181* (2013.01); *B22C 1/26* (2013.01);
(Continued)

(58) Field of Classification Search
CPC ........................................................ B22C 3/00
See application file for complete search history.

(56) References Cited

U.S. PATENT DOCUMENTS 2,273,326 A * 2/1942 McKee ..................... B22C 3/00
106/237
2,313,674 A * 3/1943 Salzberg ............... B22C 1/2246
428/451
(Continued)

FOREIGN PATENT DOCUMENTS

EP    3 124 134 A1    2/2017
GB       747579 A     4/1956
(Continued)

OTHER PUBLICATIONS

Engineer's Handbook, Manufacturing Processes—Skin Dried Molding, <http://www.engineershandbook.com/MfgMethods/skindriedmolding.htm>, Internet Archive Dated to at least Aug. 19, 2012. (Year: 2012).*

(Continued)

*Primary Examiner* — Kevin E Yoon
*Assistant Examiner* — Jacky Yuen
(74) *Attorney, Agent, or Firm* — Sughrue Mion, PLLC (57) ABSTRACT

A casting green sand mold comprising at least a pair of green sand mold parts each having a cavity portion, which are stacked with their cavity portions aligned to form a metal-melt-receiving cavity; each of the green sand mold parts being formed by casting sand containing a binder and water; a hardening-resin-based coating layer being formed on at least the cavity portion of each green sand mold part; the coating layer having gas-permeable pores having sufficient permeability to permit a gas generated by pouring a metal melt to escape; and a water content in a surface layer including the coating layer in a range from the cavity surface (Continued)

to the depth of 5 mm being smaller than that in the inner portion of the green sand mold.

12 Claims, 5 Drawing Sheets

(51) Int. Cl.
    *B22C 9/12* (2006.01)
    *B22C 1/16* (2006.01)
    *B22C 1/18* (2006.01)
    *B22C 1/26* (2006.01)
    *B22D 23/00* (2006.01)
    *C09D 161/06* (2006.01)
    *C22C 38/00* (2006.01)
    *C22C 38/34* (2006.01)
    *C22C 38/44* (2006.01)
    *C22C 38/58* (2006.01)

(52) U.S. Cl.
    CPC .............. *B22C 3/00* (2013.01); *B22C 9/12* (2013.01); *B22D 23/00* (2013.01); *C09D 161/06* (2013.01); *C22C 38/002* (2013.01); *C22C 38/34* (2013.01); *C22C 38/44* (2013.01); *C22C 38/58* (2013.01)

(56) References Cited

U.S. PATENT DOCUMENTS

| | | | | |
|---|---|---|---|---|
| 2,425,978 | A | * | 8/1947 | Anderson, Jr. ........... B22C 3/00 164/369 |
| 4,636,262 | A | * | 1/1987 | Reed ........................ B22C 1/02 106/38.3 |
| 2009/0095439 | A1 | | 4/2009 | Stotzel et al. |
| 2017/0080481 | A1 | | 3/2017 | Fukumoto |

FOREIGN PATENT DOCUMENTS

| | | |
|---|---|---|
| JP | 59-197341 A | 11/1984 |
| JP | 04-220134 A | 8/1992 |
| JP | 11-309544 A | 11/1999 |
| JP | 2012-011450 A | 1/2012 |

OTHER PUBLICATIONS

Rajput, R.K., A Textbook of Manufacturing Technology (Manufacturing Processes), Laxmi Publications, 2007, pp. 48-52. (Year: 2007).*

Communication dated Feb. 27, 2018 from the European Patent Office in counterpart application No. 15836388.7.

International Search Report for PCT/JP2015/073215 dated Oct. 6, 2015, [PCT/ISA/210].

* cited by examiner

Fig. 6(c) (Amended)

Fig. 6(d) (Amended)

Fig. 6(e) (Amended)

CASTING GREEN SAND MOLD, AND METHOD FOR PRODUCING CAST ARTICLE USING IT

CROSS REFERENCE TO RELATED APPLICATIONS

This application is a National Stage of International Application No. PCT/JP2015/073215 filed Aug. 19, 2015 (claiming priority based on Japanese Patent Application No. 2014-176456 filed Aug. 29, 2014), the contents of which are incorporated herein by reference in their entirety.

FIELD OF THE INVENTION

The present invention relates to a casting green sand mold suitable for producing cast articles having improved as-cast surface quality with little as-cast surface defects, and a method for producing cast articles using such a casting green sand mold, particularly to a casting green sand mold suitable for producing heat-resistant cast steel articles having improved as-cast surface quality with little as-cast surface defects even in a small S content, and a method for producing heat-resistant cast steel articles using it.

BACKGROUND OF THE INVENTION

Casting sand for a casting green sand mold, which may be called simply "green sand mold" hereinafter, for producing cast articles is obtained by blending sand as aggregate, a binder such as bentonite, etc., a carbonaceous material (coal, starch, etc.) as a secondary additive, and water, etc. in proper proportions, so that a green sand mold has such properties as permeability, strength, cavity surface stability, compactability (CB value), etc. in desired ranges. Water is an indispensable component for letting a binder exhibit its bonding characteristic. When a green sand mold formed by water-containing casting sand is used, cast articles suffer as-cast surface defects such as surface roughening, pinholes, etc. because of water vapor and a decomposition gas (for example, a hydrogen gas) generated by the contact of a high-temperature metal melt with water, resulting in low as-cast surface quality.

To prevent casting defects caused by water added to casting sand for the green sand mold, JP 11-309544 A discloses a facing agent applied to a casting mold, comprising at least one selected from gilsonite, an engine oil and a phenol resin, which is thermally decomposed at a temperature lower than 1300° C. (for example, about 200° C.) to generate a hydrocarbon gas. The hydrocarbon gas generated by thermal decomposition reduces water in the casting mold to stable hydrogen molecules, which prevent water in the casting mold from coming into contact with a melt, thereby preventing as-cast surface defects such as pinholes, etc.

Further improvement in as-cast surface quality is recently needed for cast articles (underbody parts, engine parts, etc.) for automobiles, to achieve both weight reduction and strengthening. However, the facing agent of JP 11-309544 A cannot sufficiently reduce as-cast surface defects.

Though heat-resistant cast stainless steels are used for heat-resistance-needing cast articles such as turbo housings, etc., S (sulfur) as impurity should be as small as possible in heat-resistant cast stainless steels. However, a small S content provides low wettability of a heat-resistant cast stainless steel melt with a green sand mold, likely deteriorating as-cast surface quality.

Object of the Invention

Accordingly, an object of the present invention is to provide a casting green sand mold formed by casting sand containing a binder and water, and a method for producing cast articles having improved as-cast surface quality with little as-cast surface defects by using such a casting green sand mold.

SUMMARY OF THE INVENTION

As a result of intensive research in view of the above object, the inventors have found that (a) by making a water content in a surface layer of a cavity of a green sand mold coming into contact with a metal melt smaller than that in an inner portion of the green sand mold, and (b) by forming a coating layer for reinforcement needed by the reduction of the water content, cast articles having improved as-cast surface quality with little as-cast surface defects can be produced. The present invention has been completed based on such findings.

Thus, the casting green sand mold of the present invention comprises at least a pair of green sand mold parts each having a cavity portion, the green sand mold parts being stacked with their cavity portions aligned to constitute a metal-melt-receiving cavity;

each of the green sand mold parts being formed by casting sand containing a binder and water;

a hardening-resin-based coating layer being formed on at least the cavity portion of each green sand mold part;

the coating layer having gas-permeable pores having sufficient permeability to permit a gas generated by pouring a melt to escape; and a surface layer including the coating layer in a range from the cavity surface to the depth of 5 mm having a water content, which is smaller than the average water content of a green sand mold portion excluding the surface layer.

The method of the present invention for producing cast articles comprises the steps of forming at least a pair of green sand mold parts each having a cavity portion by casting sand containing a binder and water;

applying a coating solution containing a hardening resin to at least the cavity portion of each green sand mold part;

stacking the green sand mold parts such that their cavity portions are aligned to form a cavity, thereby forming a casting green sand mold having a hardening-resin-based coating layer on at least the cavity surface;

curing the hardening resin before or after the mold-parts-stacking step, to form a coating layer having gas-permeable pores having sufficient permeability to permit a gas generated by pouring a melt to escape;

drying a surface layer including the coating layer simultaneously with or after curing the hardening resin, thereby making a water content in the surface layer in a range from the cavity surface to the depth of 5 mm smaller than that in an inner portion of the green sand mold; and pouring a metal melt into the cavity when the surface temperature of the coating layer is 50° C. or higher.

The gas-permeable pores are preferably large numbers of communicating fine pores substantially uniformly distributed in the coating layer.

The coating layer preferably has permeability (measured by an accelerated method using a large orifice according to JIS Z2601) of 50-200.

The coating layer preferably has average hardness in a range of 50-95 measured by a self-hardening mold hardness tester.

The water content of the surface layer is preferably 2.5% or less by mass.

The green sand mold parts, to which a coating solution containing a thermosetting resin is applied, are preferably heated before or after the mold-parts-stacking step, thereby curing the thermosetting resin and drying the surface layer.

The amount of the coating solution applied is preferably 100-550 g/m² per a unit area.

Effects of the Invention

Because the casting green sand mold of the present invention has a coating layer having gas-permeable pores having sufficient permeability to permit a gas generated by pouring a melt to escape, a water content in a surface layer including the coating layer in a range from the cavity surface to the depth of 5 mm being smaller than that in the inner portion of the green sand mold, cast articles having improved as-cast surface quality with little as-cast surface defects can be produced by pouring a metal melt into the cavity when the surface temperature of the coating layer is 50° C. or higher. The method of the present invention is suitable particularly for casting heat-resistant cast steel with a small S content.

DESCRIPTION OF THE PREFERRED EMBODIMENTS

The embodiments of the present invention will be explained referring to the attached drawings without intention of restriction, and various modifications and improvements may be added within the scope of the present invention. It should also be noted that explanation concerning one embodiment is applicable to other embodiments unless otherwise mentioned.

[1] Structure of Casting Green Sand Mold

Figure 1:
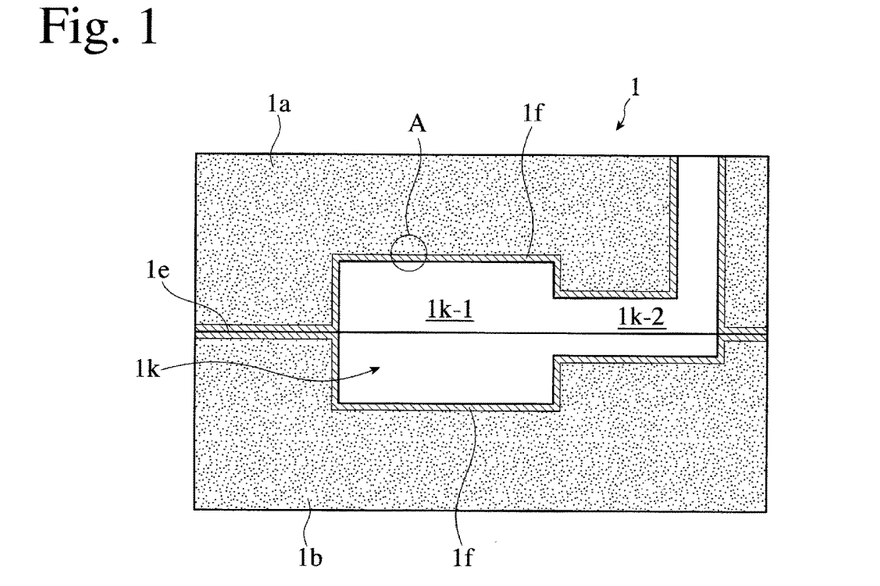
FIG. 1 is a vertical cross-sectional view showing a casting green sand mold according to an embodiment of the present invention.

As shown in FIG. 1, the casting green sand mold of the present invention 1 is constituted by a first green sand mold part (upper mold part) 1a and a second green sand mold part (lower mold part) 1b each formed by casting sand containing a binder and water, which are combined with their parting surfaces 1e mated. The combined cavity portions 1ka, 1kb of the stacked upper and lower mold parts 1a and 1b constitute an integral cavity 1k. The cavity 1k comprises not only a cavity for forming a cast article (called "product cavity") 1k-1, but also a cavity for forming a runner (simply called "runner") 1k-2, and may further include a rise, a gate, a sprue, etc. Accordingly, the "cavity" simply called in the specification is not restricted to a product cavity, but includes any space into which a metal melt is introduced (a runner, a rise, a gate, a sprue, etc.). Though a flask is omitted in FIG. 1, the flask is usually arranged around the green sand mold 1.

(1) Coating Layer and Surface Layer on Cavity

Figure 2:
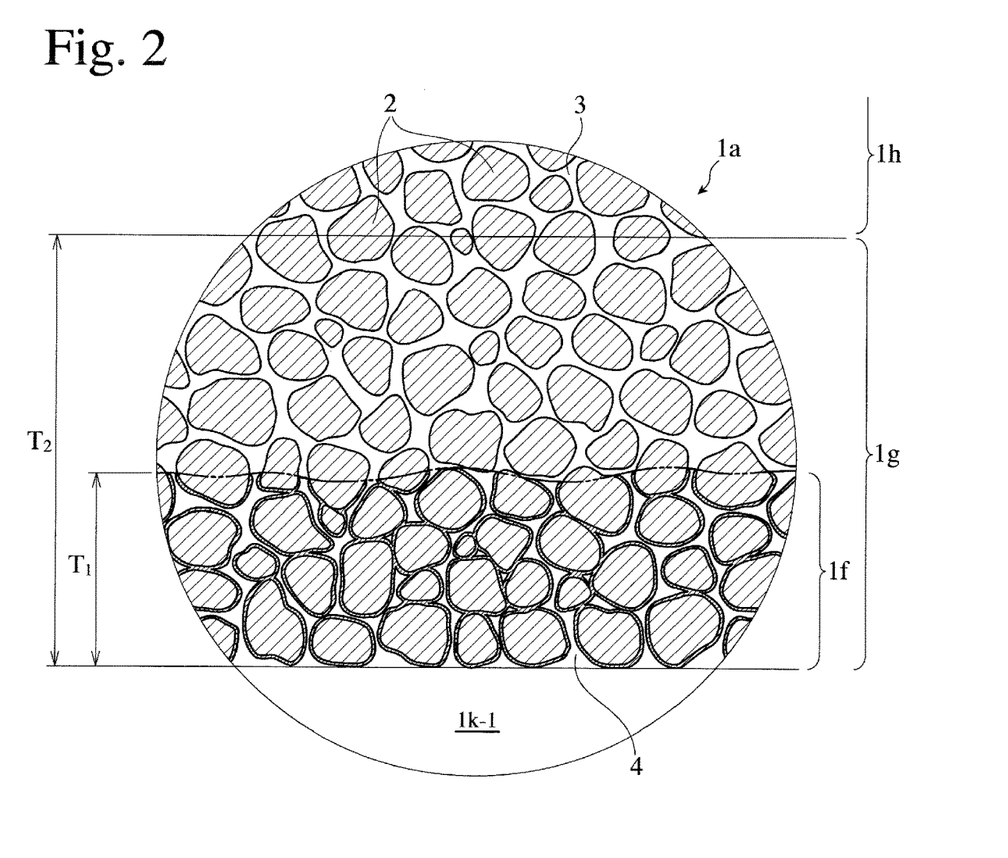
FIG. 2 is an enlarged, partial cross-sectional view showing a portion A in FIG. 1.

As shown in FIGS. 1 and 2, to improve the as-cast surface quality of cast articles, a resin coating layer 1f is formed on the surfaces of cavity portions 1ka, 1kb and parting surfaces 1e of the upper and lower mold parts 1a and 1b. Because a surface layer has low strength with a low water content as described later, the coating layer 1f acts to reinforce the surface layer. Though the coating layer 1f is formed on both cavity 1k and parting surface 1e in the depicted example, it need only be formed on at least the product cavity 1k-1 from the aspect of improving the as-cast surface quality. Because a resin coating solution applied to the cavity 1k intrudes into voids (communicating pores) 3 among sand 2 and a binder, etc., the resultant coating layer 1f has gas-permeable pores 4 communicating from the mold surface to the inside.

The thickness T1 of the coating layer 1f on the cavity 1k (particularly product cavity 1k-1) is preferably 3 mm or less. Too thick a coating layer 1f has insufficient permeability. Accordingly, the upper limit of the thickness T1 of the coating layer 1f is more preferably 2.5 mm. On the other hand, too thin a coating layer 1f is likely broken or peeled during a casting operation. When the coating layer 1f is broken or peeled, a melt comes into direct contact with sand 2 in the green sand mold, resulting in sand seizure. Therefore, the thickness T1 of the coating layer 1f is preferably 0.5 mm or more, more preferably 1 mm or more. Because the coating layer 1f formed by an impregnating resin coating solution usually does not have a uniform thickness T1, the thickness T1 is measured in plural cross sections and averaged.

A large amount of a gas such as water vapor, etc. is generated by the heat of a metal melt coming into contact with the cavity 1k, in a region from the surface of the cavity 1k to a predetermined depth (including the coating layer 1f). Water vapor coming into contact with a high-temperature metal melt intrudes into a surface portion of the melt, deteriorating the as-cast surface quality of cast articles. To obtain cast articles having good as-cast surfaces, the water content should be smaller in a region 1g from the surface of the cavity 1k to a predetermined depth (hereinafter referred to as "surface layer") than in the inner portion (portion except for the surface layer 1g) 1h of the green sand mold. A depth range of the surface layer 1g composed of the coating layer 1f and a mold region inside the coating layer 1f, whose water content affects the as-cast surface quality of cast articles, is from the surface to the depth T2 of about 5 mm. Accordingly, as shown in FIG. 2, the surface layer 1g is defined as a region (including the coating layer 1f) from the surface of the casting green sand mold 1 to the depth T2 of 5 mm. In the inner portion 1h of the green sand mold inside the surface layer 1g, the water content is substantially uniform. The water content should be smaller in the surface layer 1g than in the inner portion 1h of the green sand mold. Particularly, the water content of the surface layer 1g is preferably 2.5% or less by mass, more preferably 2% or less by mass. The lower limit of the water content of the surface layer 1g may be 0.5% by mass. Though variable depending on the casting green sand mold, the water content of the inner portion 1h of the casting green sand mold is generally about 3-5% by mass. With a reduced water content in the surface layer 1g, cast articles having sound as-cast surface quality can be obtained.

(2) Gas-Permeable Pores of Coating Layer

Gas-permeable pores 4 in the coating layer 1f enable (a) the vaporization of water in the surface layer 1g, thereby optimally controlling the water content of the surface layer 1g while keeping moisture in the inner portion 1h of the green sand mold, and (b) the outward discharge of a gas generated from the melt, thereby preventing the gas from remaining in castings, and thus preventing defects such as cold shut, pinholes, etc. With large permeability and good melt flow, a gas generated from the melt can easily escape through the green sand mold, reducing defects such as cold shut, pinholes, etc. Accordingly, the gas-permeable pores 4 are preferably constituted by large numbers of communicating fine pores. To obtain such effects uniformly regardless of portions on the cavity, fine pores are preferably uniformly distributed. The permeability (measured by an accelerated method using a large orifice according to JIS Z2601) of the surface layer 1g (including the coating layer 1f) of the cavity 1k is preferably 50-200.

(3) Hardening Resin

To form the high-strength coating layer 1f having gas-permeable pores efficiently, a hardening resin forming the coating layer 1f is preferably a thermosetting resin. The thermosetting resins include, for example, phenol resins, epoxy resins, melamine resins, urea resins, unsaturated polyester resins, alkyd resins, polyurethanes, thermosetting polyimides, etc. Because the coating layer 1f of a thermosetting resin is easily decomposed and gasified when coming into contact with a high-temperature metal melt, it can prevent the surface carburization of cast articles. The coating layer 1f preferably has average hardness of 50-95. The hardness of the coating layer 1f is measured by a self-hardening mold hardness tester (NK-009 available from Nakayama Co., Ltd.). The coating layer 1f having too low hardness has too low strength, likely resulting in the breakage of a green sand mold. On the other hand, too hard a coating layer 1f does not have sufficient permeability because of too small numbers of gas-permeable pores 4, resulting in gas defects in cast articles.

[2] Production Method of Cast Article (A) First and Second Production Methods

Figure 3A:
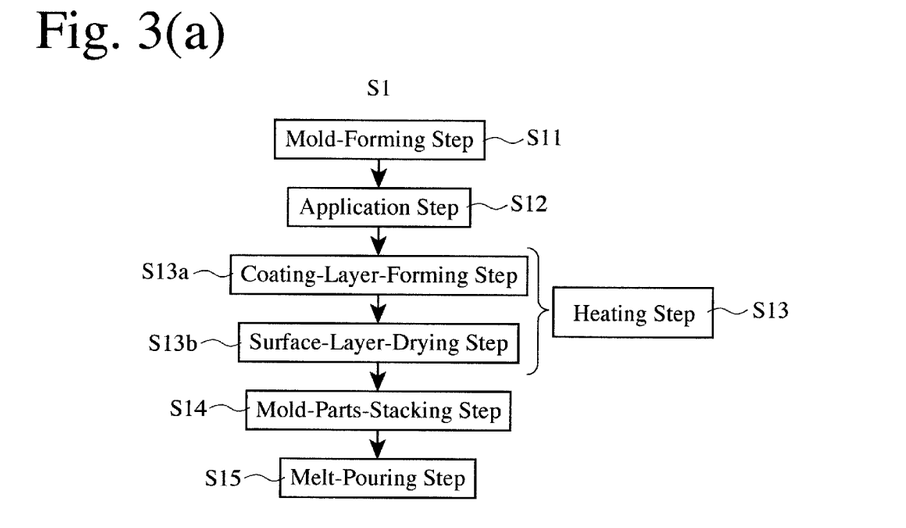
FIG. 3(a) is a flowchart showing the first production method of a cast article.
Figure 3B:
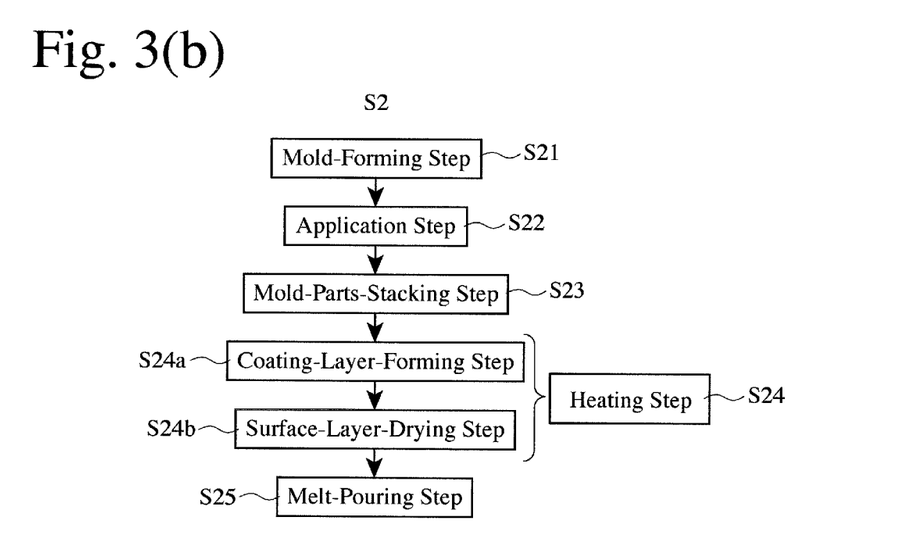
FIG. 3(b) is a flowchart showing the second production method of a cast article.

The first production method of a cast article is conducted according to the flowchart shown in FIG. 3(a), and the second production method is conducted according to the flowchart shown in FIG. 3(b). A heating step is conducted before a mold-parts-stacking step in the first method S1, while the heating step is conducted after the mold-parts-stacking step in the second method S2. Because they are not different in other points, the first and second production methods will be explained commonly, unless otherwise mentioned.

(1) Mold-Forming Step S11 (S21)

Figure 4A:
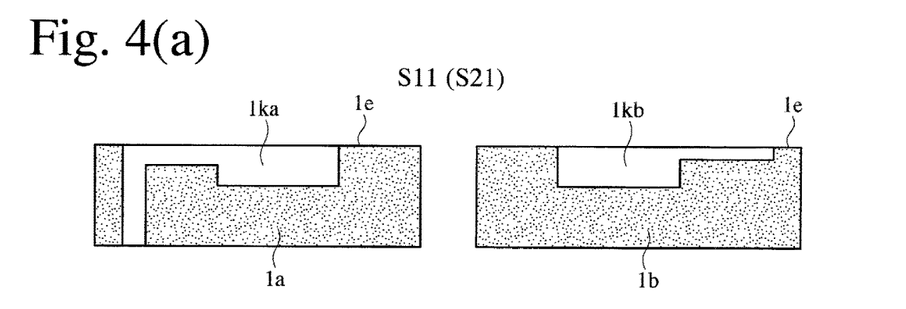
FIG. 4(a) is a cross-sectional view showing a mold-forming step in the first and second production methods of a cast article.

As shown in FIG. 4(a), casting sand is formed into a first green sand mold part (upper mold part) 1a and a second green sand mold part (lower mold part) 1b having cavity portions 1ka, 1kb, which are combined to form a desired product cavity 1k. The upper mold part 1a and the lower mold part 1b can be formed, for example, by setting each casting design model having a desired cavity portion 1ka, 1kb on a flat plate, and setting a flask around each casting design model on the flat plate, charging the casting sand into each flask, compressing the casting sand by a jolt squeeze method, etc., and then removing the design model.

The casting sand having desired properties can be prepared by blending predetermined amounts of sand, a binder, water, and a carbonaceous component, if necessary. Though variable depending on the properties of the green sand mold, the composition of the casting sand generally comprises 100 parts by mass of sand, 5-12 parts by mass of a binder, and 3-6 parts by mass of water. Accordingly, the water content in the casting sand is 2.8-5% by mass. When the carbonaceous component is added, its amount is preferably 3 parts or less by mass per 100 parts by mass of sand.

As aggregate constituting the casting sand, sand per se may be usual one for casting, which may be, for example, mountain sand, semi-synthesized sand or synthesized sand. The mountain sand may be natural mountain sand containing at least 2% by mass of clay, for example, Noma sand in Aichi Prefecture, Kawachi sand in Osaka, etc. The semi-synthesized sand may be mountain sand properly blended with silica sand, a binder and additives. The synthesized sand may be sand blended with a binder and additives without using mountain sand at all. Sand for the synthesized sand may be natural silica sand such as Gairome silica sand and beach sand, river sand, artificial silica sand; zirconium silicate, olivine sand, chromite sand, etc. These types of sand may be used alone or in combination.

The binder may be Kibushi clay, bentonite, montmorillonite, kaolin, etc. These binders may be used alone or in combination. The carbonaceous component may be coal, graphite, cokes, asphalt, dextrin, starch, etc. These carbonaceous components may be used alone or in combination.

(2) Application Step S12 (S22)

Figure 4B:
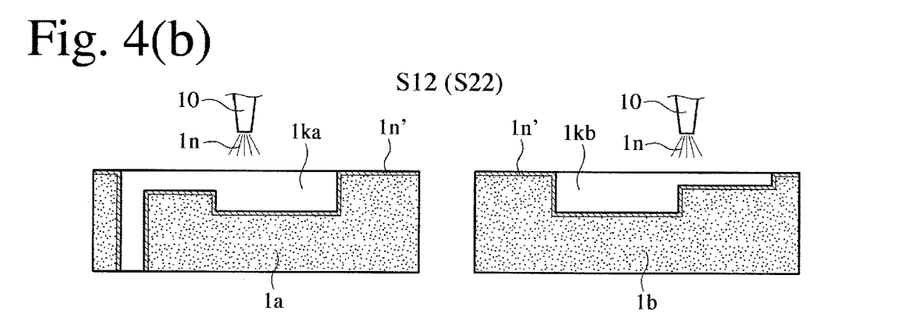
FIG. 4(b) is a cross-sectional view showing an application step of a coating solution in the first and second production methods of a cast article.

As shown in FIG. 4(b), a coating solution 1n containing a hardening resin is applied to the cavity portions 1ka and 1kb of the upper and lower mold parts 1a, 1b. Though the coating solution 1n can be applied by a blush, etc., it can be ejected from a horizontally moving spray nozzle 10 to form a uniform coating layer 1f with a stable coating amount.

The hardening resin may be a thermosetting resin, an ultraviolet-hardening resin, a gas-hardening resin, a self-hardening resin, etc., and is preferably a thermosetting resin easily curable by heating. By heating the applied coating solution 1n containing a thermosetting resin in an organic solvent, the coating solution 1n can be dried, simultaneously with forming gas-permeable pores in the coating layer 1f, and controlling the water content of a surface layer 1g (drying).

The viscosity of the coating solution 1n is preferably adjusted to 10-100 mPa·s. As shown in FIG. 2, the coating solution 1n having viscosity in this range penetrates into the sand mold from the surfaces of the cavity portions 1ka and 1kb through voids 3 between sand particles 2, forming a coating layer 1f having a thickness T1 (preferably in a range of 0.5-3 mm). The viscosity of the coating solution 1n is measured by a Brookfield viscometer according to JIS K6910.

When the viscosity of the coating solution 1n is more than 100 mPa·s, the coating solution 1n does not easily penetrate into the green sand mold. As a result, (a) a coating layer 1f is formed only near the surfaces of the cavity portions 1ka and 1kb, so that it is easily peelable, and (b) a coating layer 1f has insufficient gas-permeable pores 4. On the other hand, when the viscosity of the coating solution 1n is less than 10 mPa·s, the coating solution 1n excessively penetrates into the green sand mold, resulting in a weak coating layer 1f exceeding the optimum thickness T1.

The percentage of a resin in the coating solution 1n having viscosity in the above range is preferably 20-70% by mass. When the percentage of a hardening resin in the coating solution 1n is less than 20% by mass, a coating layer 1f having sufficient strength cannot be obtained. When the percentage of a hardening resin in the coating solution 1n is more than 70% by mass, the coating solution 1n is too viscous, so that the hardening resin does not sufficiently intrude between casting sand, resulting in a coating layer 1f having insufficient gas-permeable pores.

The amount of the coating solution 1n applied is preferably 100-550 g/m². When the amount of the coating solution 1n applied is less than 100 g/m², the resultant coating layer 1f is not so thick that it is easily peelable. On the other hand, when the amount of the coating solution 1n applied is more than 550 g/m², the coating solution 1n penetrates into the green sand mold excessively, resulting in a too thick coating layer 1f having insufficient strength.

In the first method S1, the coating solution 1n is applied to the cavity portions 1ka and 1kb before stacking the upper and lower mold parts 1a and 1b. However, the timing of applying the coating solution 1n is not restrictive, but it may be applied after stacking the upper and lower mold parts 1a and 1b as in the second method S2. When the application step of a coating solution 1n is carried out after the mold-parts-stacking step, the coating solution 1n is not applied to the parting surfaces of the combined upper and lower mold parts 1a and 1b.

(3) Coating-Layer-Forming Step S13a (S24a)

Figure 4C:
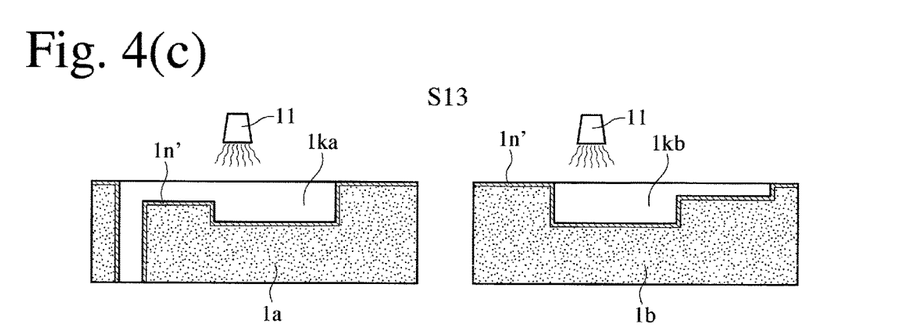
FIG. 4(c) is a cross-sectional view showing a heating step in the first production method of a cast article.

As shown in FIG. 4(c), when the coating solution 1n applied to the cavity portions 1ka and 1kb of the upper and lower mold parts 1a and 1b is dried by heating, the hardening resin layer 1n' formed is hardened, forming a coating layer 1f having average hardness (measured by a self-hardening mold hardness tester) of 50-95. The hardening method of the hardening resin layer 1n' is determined depending on the type of the hardening resin. For example, in the case of a thermosetting resin, it is heated by hot air blown from a horizontally moving nozzle 11, or by horizontally arranged heating means (for example, incandescent lamps). In the case of a gas-hardening resin, the green sand mold is placed in a closed chamber, into which a resin-hardening gas is introduced.

(4) Surface-Layer-Drying Step S13b (S24b)

As shown in FIG. 4(c), water is evaporated by heating from the coating layer 1f and its inside region (surface layer) 1g, such that the surface layer 1g has a smaller water content than in the inner portion 1h of the green sand mold. The water content in the surface layer 1g is preferably 2.5% or less by mass. The lower limit of the water content in the surface layer 1g is preferably 0.5% by mass. Though not restrictive, drying is made, for example, by hot air blown from a horizontally moving nozzle 11 as shown in FIG. 4(c), or by horizontally arranged heating means (for example, incandescent lamps).

When the thermosetting resin in the coating solution is thermally cured, the step of forming a coating layer 1f (S13a, S24a) and the step of drying a surface layer 1g (S13b, S24b) can be conducted simultaneously by one heating step (S13, S24). When the coating layer 1f is heated to a surface temperature of 100° C. or higher, the curing and drying time can be reduced.

(5) Mold-Parts-Stacking Step S14 (S23)

Figure 4D:
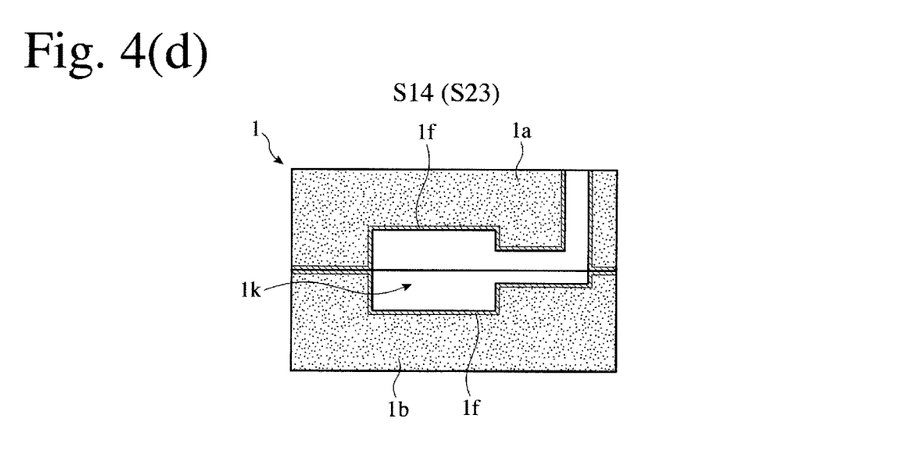
FIG. 4(d) is a cross-sectional view showing a mold-parts-stacking step in the first production method of a cast article.

After the heating step (S13, S24), the upper mold part 1a and the lower mold part 1b each having a coating layer 1f are combined as shown in FIG. 4(d), such that their cavity portions 1ka and 1kb are aligned to form a cavity 1k, resulting in a casting green sand mold 1 integrally having a cavity 1k as shown in FIG. 1.

(6) Melt-Pouring Step

A melt is poured into a product cavity 1k-1 of a casting green sand mold 1 formed by combing the upper mold part 1a and the lower mold part 1b, through a runner 1k-2 to produce a cast article. The melt-pouring step starts when the surface temperature of the coating layer 1f is 50° C. or higher. After the heating step (S13, S24), the temperature of the coating layer 1f lowers as the time passes, so that water moves from the inner portion 1h of the green sand mold to the surface side, resulting in an increased water content in the surface layer 1g. When the surface temperature of the coating layer 1f is 50° C. or higher, increase in the water content of the surface layer 1g can be suppressed. Also, when the surface temperature of the coating layer 1f is 50° C. or higher, a melt can flow in the cavity 1k with small friction, effectively reducing cold shut defects and sand inclusion defects. The surface temperature of the coating layer 1f need not be higher than the curing temperature of the thermosetting resin, and its upper limit may be 100° C.

Though the heating step S13 is conducted before the mold-parts-stacking step S14 in the first method S1 as shown in FIG. 3(a), the heating step S24 may be conducted after the mold-parts-stacking step S23 as in the second method S2 shown in FIG. 3(b). In the second method S2, too, the water content can be lower in the cavity surface layer 1g than in the inner portion 1h of the green sand mold.

(B) Third Production Method

Figure 5:
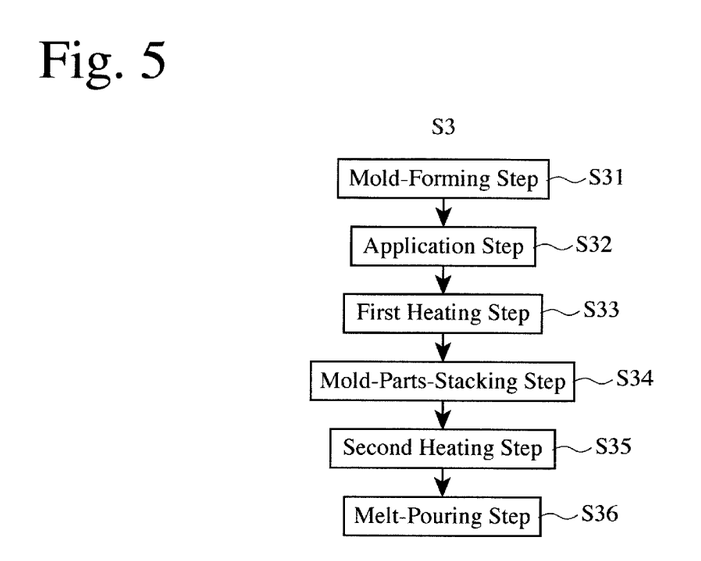
FIG. 5 is a flowchart showing the third production method of a cast article.

The third production method of a cast article will be explained referring to FIGS. 5 and 6. In FIG. 6, the same reference numerals are assigned to the same portions as in FIG. 4, and their detailed explanation will be omitted. As shown in FIG. 5, the third method S3 comprises first and second heating steps S33, S35 for curing a thermosetting resin and drying the surface layer 1g. A mold-forming step S31, an application step S32, a mold-parts-stacking step S34 and a melt-pouring step S36 are basically the same as in the first method.

Figure 6A:
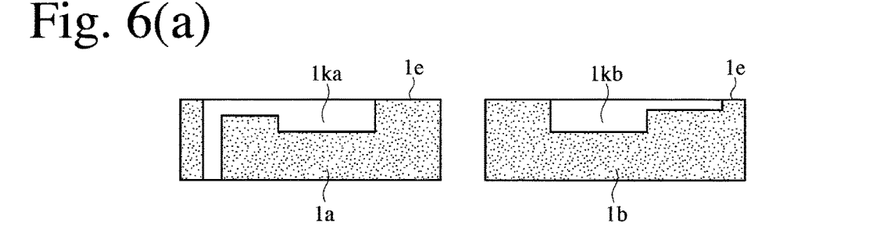
FIG. 6(a) is a cross-sectional view showing a mold-forming step in the third production method of a cast article.
Figure 6B:
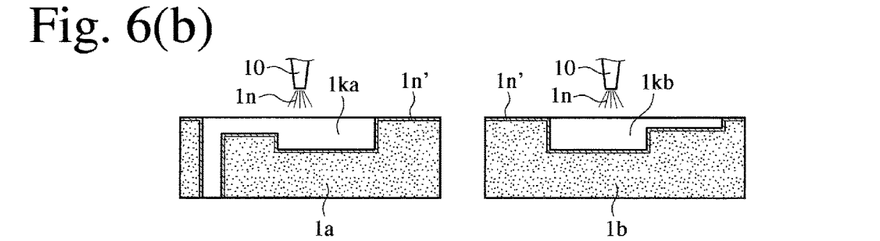
FIG. 6(b) is a cross-sectional view showing an application step of a coating solution in the third production method of a cast article.
Figure 6C:
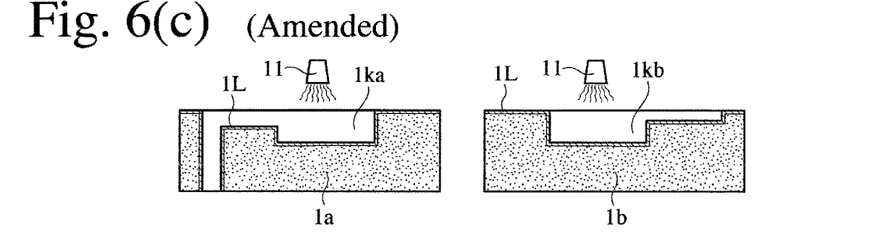
FIG. 6(c) is a cross-sectional view showing a first heating step in the third production method of a cast article.
Figure 6D:
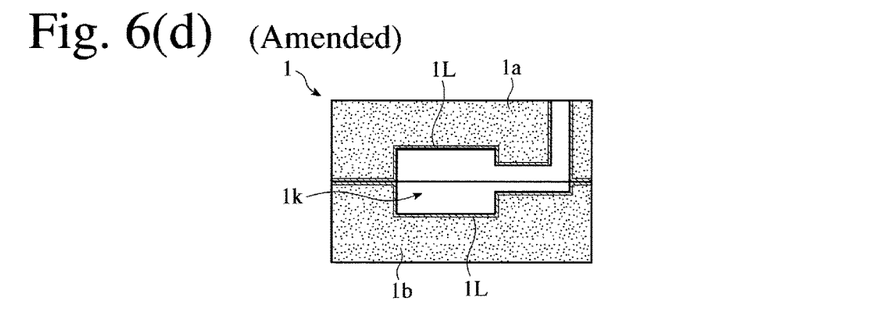
FIG. 6(d) is a cross-sectional view showing a mold-parts-stacking step in the third production method of a cast article.
Figure 6E:
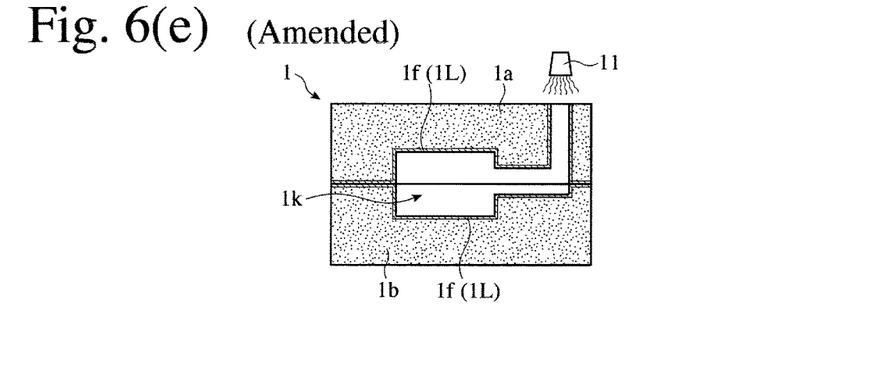
FIG. 6(e) is a cross-sectional view showing a second heating step in the third production method of a cast article.

In the application step S32 of the third method S3 shown in FIG. 6(b), a coating solution 1n is applied to the cavity portions 1ka, 1kb of the upper and lower mold parts 1a and 1b formed in the mold-forming step S31 shown in FIG. 6(a). In the first heating step S33 shown in FIG. 6(c), a hot air for heating is blown from the nozzle 11 to the layer 1n' of the coating solution 1n, to form a half-cured layer 1L having lower hardness than that of a coating layer. Thereafter, in the mold-parts-stacking step S34 shown in FIG. 6(d), the upper and lower mold parts 1a and 1b each having a half-cured layer 1L are combined. In the second heating step S35 shown in FIG. 6(e), a hot air is blown from the nozzle 11 into the cavity 1k through a sprue, to further heat the half-cured layer 1L to form the coating layer 1f.

Cracking, etc. due to the rapid curing of the thermosetting resin can be reduced by conducting the first heating step S33 of forming the half-cured layer 1L, a preliminary heat-curing step, before the second heating step S35 of forming the coating layer 1f having a target hardness. From this aspect, the half-cured layer 1L formed after the first heating step S33 shown in FIG. 6(c) preferably has average hardness (measured by a self-hardening mold hardness tester) of 30-45, and the coating layer 1f obtained by thermally curing the half-cured layer 1L preferably has average hardness (measured by a self-hardening mold hardness tester) of 50-95.

Example 1

Second Method S2 Conducted by Steps Shown in FIG. 3(b)

(1) Mold-Forming Step S21

100 parts by mass of silica sand was blended with 5 parts by mass of a binder and water, to prepare casting sand having a water content of 4.5% by mass. Casting sand was charged into flasks (not shown) of 0.5 m×0.6 m, in each of which a casting design model was set on a flat plate, and compressed by a jolt-squeeze method to form two pairs of upper and lower mold parts 1a and 1b having cavity portions 1ka and 1kb shown in FIG. 4(a). The surface hardness of each cavity 1k of the upper and lower mold parts 1a, 1b was measured at five points 50 mm or more apart from the flask by a self-hardening mold hardness tester (NK-009 available from Nakayama Co., Ltd.), to determine the average hardness. As a result, the average hardness was 20 in both of the upper and lower mold parts 1a, 1b.

(2) Application Step S22

Surfaces of cavity portions 1ka, 1kb and parting surfaces 1e of two pairs of the upper and lower mold parts 1a, 1b were coated with 300 g/m² of a coating solution (solution of a phenol resin in ethanol having a phenol resin concentration of 30% by mass, and viscosity of 15 mPa·S) 1n sprayed from a nozzle 10.

(3) Mold-Parts-Stacking Step S23

Two pairs of upper and lower mold parts 1a, 1b coated with the coating solution 1n were combined to form two green sand molds 1.

(4) Heating Step S24

The coating solution 1n was dried by hot air at 105° C. introduced into the cavity 1k under pressure through a sprue of each green sand mold 1, thereby thermally curing the phenol resin, and drying the surface layer 1g of the cavity 1k, to obtain two (first and second) green sand molds 1 each having a coating layer 1f having gas-permeable pores 4 with a reduced water content in the surface layer 1g. The temperature of each dried cavity surface layer in the first and second coated green sand molds 1 was 50° C. (measured by a non-contact surface thermometer). In the first coated green sand mold 1, the permeability of each coating layer 1f in the upper and lower mold parts 1a, 1b was measured by an accelerated method using a large orifice according to JIS Z2601. As a result, the average permeability of the coating layer 1f was 110.

Five samples were taken from a surface layer 1g of the second coated green sand mold 1 at five sites in a range from the cavity surface to the depth of 5 mm. The weight of each sample was measured before and after keeping at 105±5° C. for 15 minutes, to determine their difference. The weight differences of five samples were averaged to determine weight reduction by drying, which corresponds to the water content of the surface layer 1g. It was thus found that the water content of the surface layer 1g was 1.5% by mass.

Because an inner portion 1h of the green sand mold excluding the surface layer 1g has a substantially even water content, a portion of 15 mm to 20 mm in depth from the surface was cut out of a green sand mold portion remaining after cutting out the surface layer 1g, and measured with respect to the water content by the same method as described above to determine an average water content of a green sand mold portion 1h other than the surface layer 1g (inner portion of the green sand mold). It was thus found that the inner portion 1h of the green sand mold had a water content of 3.7% by mass.

Five blocks of 3 cm×3 cm×3 cm were cut out of other portions of the cavity surface layer by a spoon, and sand was removed from each block by a brush without destroying the coating layer 1f. The thickness of each coating layer 1f was measured by a venier caliper and averaged. The hardness of the coating layer 1f was measured using the same self-hardening mold hardness tester as described above. As a result, the average hardness of the coating layer 1f was 76.

(5) Melt-Pouring Step S25

A melt of a 1.4848 material (0.4% by mass of C, 1.7% by mass of Si, 1.8% by mass of Mn, 0.03% by mass of P, 25.0% by mass of Cr, 0.4% by mass of Mo, 19.0% by mass of Ni, and 0.03% by mass of S) according to EU Standard EN10295 was poured at 1600° C. into the first coated green sand mold 1.

(6) Evaluation

The appearance of the resultant cast steel article was observed to evaluate the percentage of appearance defects such as pinholes, sand inclusion, etc. by the following standards. The results are shown in Table 1.

Excellent: The percentage of appearance defects such as pinholes, sand inclusion, etc. was 1% or less.

Good: The percentage of the above appearance defects was more than 1% and 2% or less.

Poor: The percentage of the above appearance defects was more than 2%.

Comparative Example 1

With a green sand mold 1 formed in the same manner as in Example 1 except for omitting the application step S22 and the heating step S24, a cast steel article was produced. The observation results of the appearance of the cast steel article are shown in Table 1. Because the green sand mold 1 of Comparative Example 1 had no coating layer, a melt came into direct contact with casting sand, resulting in pinholes on the casting surface in a wide range due to the evaporation of water from the green sand mold.

Examples 2 and 3

With coated green sand molds 1 formed in the same manner as in Example 1 except for changing the amount of a coating solution, cast steel articles were produced. The observation results of the appearance of the cast steel articles are shown in Table 1.

Examples 4 and 5

With coated green sand molds 1 formed in the same manner as in Example 1 except for changing the viscosity and amount of a coating solution, cast steel articles were produced. The observation results of the appearance of the cast steel articles are shown in Table 1. The coating layer 1f in Example 4 had smaller permeability because of a larger amount of a coating solution than in Example 1, resulting in a cast steel article slightly having pinholes. The coating layer 1f in Example 5 had lower hardness than that of Example 1, because of higher viscosity and smaller amount of a coating solution than in Example 1, resulting in a cast steel article slightly having sand inclusion.

TABLE 1

| No. | Ex. 1 | Com Ex. 1 | Ex. 2 | Ex. 3 | Ex. 4 | Ex. 5 |
|---|---|---|---|---|---|---|
| Coating Solution | | | | | | |
| Viscosity (mPa · s) | 15 | — | 15 | 15 | 11 | 20 |
| Amount (g/m²) | 300 | — | 100 | 550 | 800 | 90 |
| Coating Layer | | | | | | |
| Permeability | 110 | 210 | 198 | 52 | 45 | 205 |
| Thickness (mm) | 2.1 | — | 1.8 | 2.3 | 2.8 | 0.9 |
| Water Content (% by mass) | | | | | | |
| Surface Layer | 1.5 | 4.3 | 1.5 | 1.3 | 1.3 | 2.1 |
| Inner Portion | 3.7 | 4.3 | 3.7 | 3.7 | 3.7 | 3.7 |
| Casting Mold | | | | | | |
| Surface Layer Temperature (° C.) | 50 | 20 | 50 | 50 | 40 | 40 |
| Hardness | 76 | 43 | 53 | 95 | 98 | 40 |
| Appearance of Cast Steel Article | | | | | | |
| Pinholes | Excellent | Poor | Excellent | Excellent | Good | Excellent |
| Mold Breakage and Sand Inclusion | Excellent | Good | Excellent | Excellent | Excellent | Good |
| Total Evaluation[(1)] | Excellent | Poor | Excellent | Excellent | Good | Good |

Note:
[(1)]Poorer one of the evaluation of pinholes and the evaluation of mold breakage and sand inclusion was chosen as a total evaluation.

DESCRIPTION OF REFERENCE NUMERALS

1: Green sand mold
1a: First green sand mold part (upper mold part)
1b: Second green sand mold part (lower mold part)
1k: Cavity
1ka, 1kb: Cavity portion
1k-1: Product cavity
1k-2: Runner
1e: Parting surface
1f: Coating layer
1g: Surface layer
1h: Inner portion of green sand mold
1n: Coating solution
1n': Coating solution layer (hardening resin layer)
1L: Half-cured layer
2: Sand particles
3: Void
4: Gas-permeable pores
10, 11: Nozzle
T1: Thickness of coating layer
T2: Thickness of surface layer

What is claimed is:
1. A casting green sand mold comprising at least a pair of green sand mold parts each having a cavity portion, said green sand mold parts being stacked with their cavity portions aligned to constitute a metal-melt-receiving cavity; each of said green sand mold parts being formed by casting sand containing a binder and water; a hardening resin-containing coating layer being formed on at least a cavity surface of each green sand mold part;
said hardening resin-containing coating layer consisting of said casting sand, cured hardening resin and gas permeable pores between them;
said hardening resin consisting of a thermosetting resin selected from phenol resins, epoxy resins, melamine resins, urea resins, unsaturated polyester resins, alkyd resins, polyurethanes, and thermosetting polyimides;
said gas-permeable pores having sufficient permeability to permit a gas generated by pouring a melt to escape; and
a surface layer including said coating layer in a range from the cavity surface to the depth of 5 mm having a water content, which is smaller than the average water content of a green sand mold portion excluding said surface layer, wherein the water content of said surface layer is 0.5% to 2.5% by mass, and wherein a thickness of said coating layer is 0.5 mm or more and 3 mm or less.

2. The casting green sand mold according to claim 1, wherein said gas-permeable pores are composed of communicating pores substantially uniformly distributed in said coating layer.

3. The casting green sand mold according to claim 1, wherein said surface layer has permeability, measured by an accelerated method using a large orifice according to JIS Z2601, of 50-200.

4. The casting green sand mold according to claim 1, wherein said coating layer has average hardness in a range of 50-95 when measured by a self-hardening mold hardness tester.

5. The casting green sand mold according to claim 1, wherein the water content of said surface layer is 0.5% to 2.0% by mass.

6. The casting green sand mold according to claim 1, wherein the water content of said surface layer is 1.3% to 2.1% by mass.

7. A method for producing cast articles comprising the steps of forming at least a pair of green sand mold parts each having a cavity portion by casting sand containing a binder and water;
- applying a coating solution containing a hardening resin to at least a cavity surface of each green sand mold part;
- stacking said green sand mold parts such that their cavity portions are aligned to form a cavity, thereby forming a green sand mold having a hardening resin-containing coating layer on at least the cavity surface;
- curing said hardening resin before or after said mold-parts-stacking step, to form a coating layer consisting of said casting sand, cured hardening resin and gas permeable pores between them, said hardening resin consisting of a thermosetting resin selected from phenol resins, epoxy resins, melamine resins, urea resins, unsaturated polyester resins, alkyd resins, polyurethanes, and thermosetting polyimides, said gas-permeable pores having sufficient permeability to permit a gas generated by pouring a melt to escape;
- drying a surface layer including said coating layer simultaneously with or after curing said hardening resin, thereby making a water content in said surface layer in a range from the cavity surface to the depth of 5 mm smaller than that in the inner portion of said green sand mold, wherein the water content of said surface layer is 0.5% to 2.5% by mass, and wherein a thickness of said coating layer is 0.5 mm or more and 3 mm or less; and
- pouring a metal melt into said cavity when the surface temperature of said coating layer is 50° C. or higher.

8. The method for producing cast articles according to claim 7, wherein said green sand mold parts to which said coating solution is applied are heated before or after said mold-parts-stacking step, thereby curing said thermosetting resin and drying said surface layer.

9. The method for producing cast articles according to claim 7, wherein the amount of said coating solution applied is 100-550 g/m$^2$ per a unit area.

10. The method for producing cast articles according to claim 7, wherein said gas-permeable pores are communicating pores substantially uniformly distributed in said coating layer.

11. The method for producing cast articles according to claim 7, wherein said surface layer has permeability, measured by an accelerated method using a large orifice according to JIS Z2601, of 50-200.

12. The method for producing cast articles according to claim 7, wherein said coating layer has average hardness in a range of 50-95 when measured by a self-hardening mold hardness tester.

* * * * *